(12) United States Patent
Kung (10) Patent No.: US 8,450,988 B2
(45) Date of Patent: May 28, 2013

(54) SYSTEMS AND METHODS FOR CONTROLLING INDUCTIVE ENERGY IN DC-DC CONVERTERS

(75) Inventor: Steven Fan-Nin Kung, Portland, OR (US)

(73) Assignee: Maxim Integrated Products, Inc., San Jose, CA (US)

( * ) Notice: Subject to any disclaimer, the term of this patent is extended or adjusted under 35 U.S.C. 154(b) by 269 days.

(21) Appl. No.: 13/046,212

(22) Filed: Mar. 11, 2011

(65) Prior Publication Data

US 2012/0081095 A1 Apr. 5, 2012

Related U.S. Application Data

(60) Provisional application No. 61/389,993, filed on Oct. 5, 2010.

(51) Int. Cl.
*G05F 1/40* (2006.01)
*G05F 1/44* (2006.01)
*G05F 1/56* (2006.01)

(52) U.S. Cl.
USPC ........... 323/282; 323/222; 323/223; 323/224; 323/284; 323/285; 323/286; 323/288

(58) Field of Classification Search
USPC ................. 323/222, 223, 224, 282, 284, 285, 323/286, 288
See application file for complete search history.

(56) References Cited

U.S. PATENT DOCUMENTS

| | | | | |
|---|---|---|---|---|
| 5,877,611 | A | * | 3/1999 | Brkovic ......................... 323/222 |
| 5,982,160 | A | * | 11/1999 | Walters et al. ................. 323/282 |
| 6,127,814 | A | * | 10/2000 | Goder ........................... 323/282 |
| 6,249,447 | B1 | * | 6/2001 | Boylan et al. .................... 363/97 |

* cited by examiner

*Primary Examiner* — Bao Q Vu (57) ABSTRACT

A DC-DC converter comprises a high-side switch, a low-side switch connected to the high-side switch, and an output capacitance. An inductance has one end connected to the high-side switch and the low-side switch and another end connected to the output capacitance. A shunting device circulates current flowing through the inductance back to the inductance during a load reduction transition to control a voltage across the output capacitance.

20 Claims, 5 Drawing Sheets

SYSTEMS AND METHODS FOR CONTROLLING INDUCTIVE ENERGY IN DC-DC CONVERTERS

CROSS-REFERENCE TO RELATED APPLICATIONS

This application claims the benefit of U.S. Provisional Application No. 61/389,993, filed on Oct. 5, 2010. The entire disclosure of the above application is incorporated herein by reference.

FIELD

The present disclosure relates to power converters, and more particularly to systems and methods for controlling inductive energy in power converters.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

DC-DC converters may be used to perform step-down power conversion. For example, DC-DC converters may be used in electronic systems requiring high-quality, low DC voltages to supply sensitive integrated circuits. Applications such as central processing units (CPUs) or graphics processing units (GPUs) may require low voltages around 1 V DC. The DC-DC converters may include a buck converter with a high-side switch, a low-side switch, an inductance, and an output capacitance. The switching frequency and the sizes of the switches, inductance, and output capacitance are optimized for a particular application.

After the high-side switch is opened, the stored energy in the inductance flows to the output capacitance (and load) as dictated by the LC resonance cycle of the inductance and the output capacitance, and by the characteristics of the load. The peak output voltage is a direct result of the continuous current in the inductance necessarily flowing into the output capacitance and load. The load must be able to withstand the peak output voltage.

The value of the inductance is usually kept relatively low to limit stored energy, inductor site, and winding copper loss. Limiting stored energy is one way to limit the increase in the output voltage so as to not adversely impact the reliability of the load. However, the low inductance value requires a high converter switching frequency in order to prevent inductance saturation and to limit ripple current. Higher switching frequency tends to increase converter switching losses and lower overall efficiency.

SUMMARY

A DC-DC converter comprises a high-side switch, a low-side switch connected to the high-side switch, and an output capacitance. An inductance has one end connected to the high-side switch and the low-side switch and another end connected to the output capacitance. A shunting device circulates current flowing through the inductance in response to a load reduction transition to control a voltage across the output capacitance.

In other features, the shunting device comprises a first switch connected in parallel across the inductance. Alternatively, the shunting device comprises first and second switches that are connected in series. The first and second switches are connected in parallel across the inductance. At least one of the first and second switches remains open during steady-state load demand.

In other features, a voltage sensor senses voltage across the output capacitance. A controller communicates with the voltage sensor and the shunting device, opens the shunting device during load demand, and closes the shunting device in response to the load reduction transition when the voltage across the capacitance is greater than a predetermined voltage.

In other features, the controller turns the shunting device on in an open-loop manner for a predetermined period during the load reduction transition. The controller turns the shunting device on in a closed-loop manner in response to the load reduction transition for a period based on a monitored operating parameter of the DC-DC converter. The controller turns the shunting device on and off in an open-loop manner at a predetermined duty cycle for a predetermined period during the load reduction transition. The controller turns the shunting device on and off in a closed-loop manner in response to the load reduction transition at a duty cycle and period that are based on a monitored operating parameter of the DC-DC converter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Some of the apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
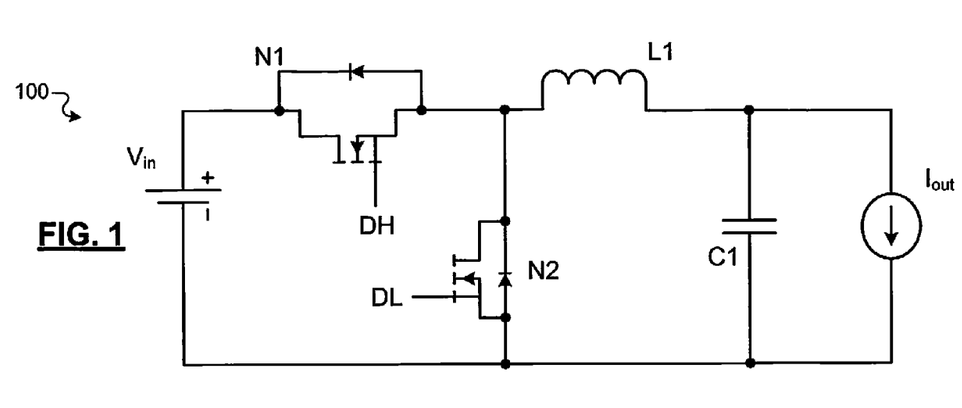
FIG. 1 is an electrical schematic of a buck converter.
Figure 2:
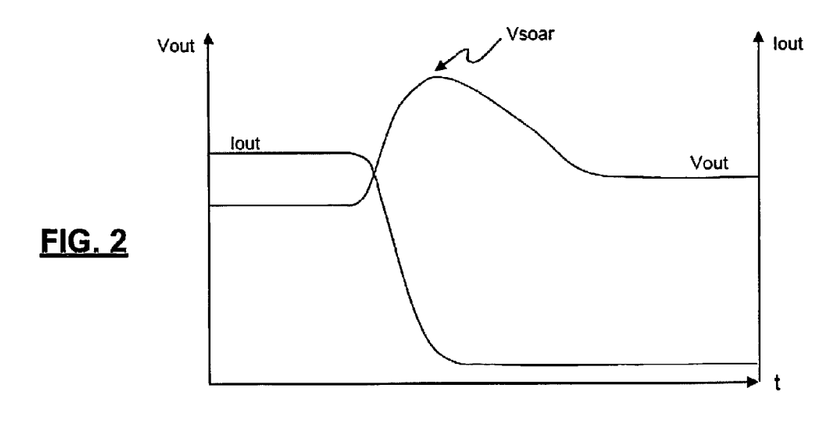
FIG. 2 is a graph illustrating voltage of the output capacitance and current of the output load for the buck converter of FIG. 1.

Referring now to FIGS. 1 and 2, a buck converter 100 includes a high-side switch N1 and a synchronous rectifier N2 (or low-side switch). The buck converter 100 further includes an inductance L1 and an output capacitance C1. Switches N1 and N2 are driven with complimentary gate drive signals DH and DL, respectively. An output load is represented by $I_{OUT}$.

When the load $I_{OUT}$ suddenly decreases from a high DC load to a low DC load, current in the inductance L1 is discharged into the capacitance C1 and output load after the high-side switch N1 is turned OFF and held OFF. The voltage $V_{C1}$ tends to rise above the target regulation level. When the load $L_{our}$ steps to 0 A, all of the energy in the inductance L1 is transferred into the capacitance C1. This causes the voltage ($V_{C1}$) across the capacitance C1 to soar (or voltage soar $V_{soar}$) substantially above its regulation target.

In general, the output inductance L1 may be sized small enough such that a maximum stored energy at a current maximum ($I1_{max}$), when completely discharged into the capacitance C1, raises the voltage $V_{C1}$ within an allowable ΔV. A minimum value of the inductance L1 is bounded by the highest switching frequency allowable, saturation characteristics, and ripple current requirements.

The capacitance C1 may be sized to limit the soar voltage resulting from discharge of the inductance L1. In CPU applications, the soar voltage requirement sets the minimum value of the capacitance C1 that is required and switching losses (of the high-side switch N1 and the low side switch N2). Converter efficiency requirements set the maximum allowable switching frequency and the minimum allowable value of the inductance L1.

The switches N1, N2 are usually unable to effectively mitigate the soar voltage. In some conventional circuits, body braking may be used. In these circuits, the voltage $V_{C1}$ is sensed and the switch N2 is gated OFF during discharge of the inductance L1 to increase the voltage across the inductance L1 ($V_{C1}$+switch N2 body diode voltage). This approach approximately doubles the discharge rate of the inductance L1 (where N2 body diode forward voltage approximates $V_{out}$) to decrease the soar voltage magnitude.

Systems and methods according to the present disclosure use an active element to control current discharging from the inductance L1 into the capacitance C1, which limits the magnitude of the soar voltage. This approach reduces requirements relating to the capacitance C1, the inductance L1, effective converter closed-loop bandwidth, and minimum switching frequency. This approach also allows additional degrees of freedom when optimizing converter efficiency, reducing output capacitance size, and/or reducing converter cost without sacrificing soar voltage transient response.

For example, the systems and methods described herein may include the use of a controlled shunt device having a low impedance connected across the inductance L1. The shunt device circulates current of the inductance L1 around the inductance L1 to control delivery of energy from the inductance L1 to the capacitance C1 and the load $I_{OUT}$. While specific examples of the controlled shunt device are shown below, any combination of controlled switches that circulates the inductor current around itself can be used.

The L1/C1 resonance cycle is time-shifted (delayed and modulated) from its typical time, which allows the load to discharge the capacitance C1 between resonance peaks. The resulting clamped soar voltage enables significant reduction in the capacitance C1 without requiring an increase in switching frequency. In addition, low-load efficiency can be increased by enabling increased high-side switch on-time in discontinuous conduction mode (DCM) of operation without increase in output ripple.

Referring now to FIGS. 3-6, a buck converter 200 according to the present disclosure is shown. The buck converter 200 further comprises a controlled shunt device 210. The shunt device 210 includes series-connected switches N3 and N4, which are connected in parallel across the inductance L1. The switches N3 and N4 are controlled by a gate drive signal DLG. A current sensor 214 may optionally be used to sense current through the inductance L1 using any suitable approach. A voltage sensor 216 senses voltage across the capacitance C1.

Figure 4:
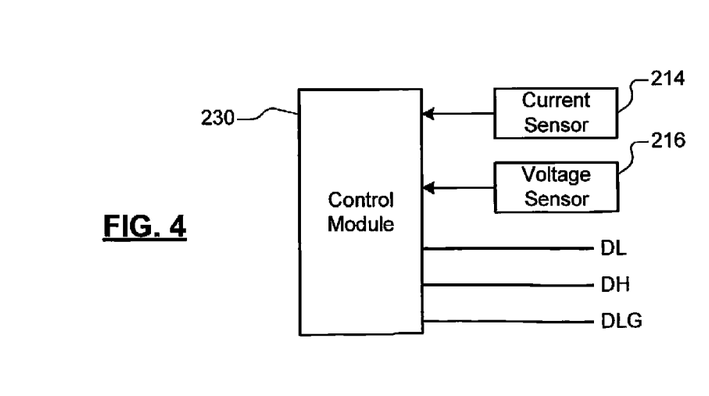
FIG. 4 is a functional block diagram of a control module that controls switches in the buck converter of FIG. 3 during operation.
Figure 5:
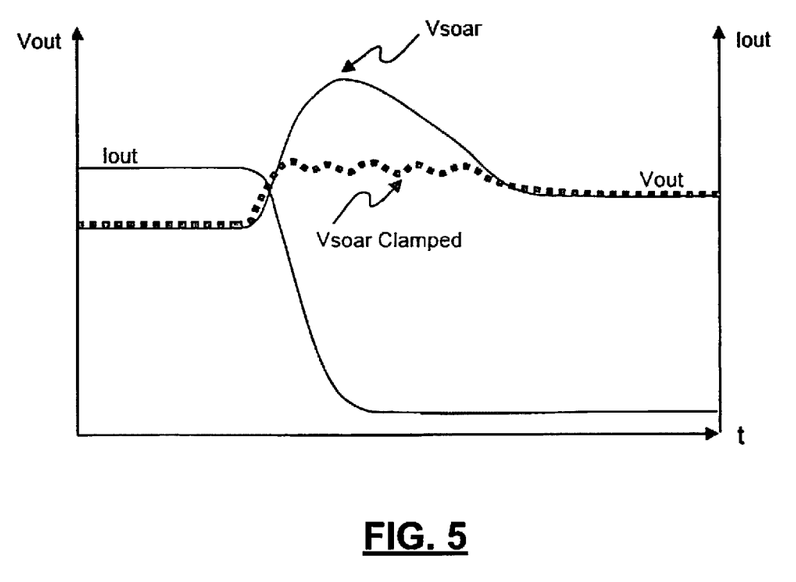
FIG. 5 is a graph illustrating voltage of the output capacitance and current of the output load for the buck converter of FIG. 3 and the control module of FIG. 4.

In FIG. 4, a control module 230 controls operation of the switches N1, N2, N3 and N4 based on the inductance current, capacitance voltage and/or other operating parameters of the buck converter. The control module 230 may include memory storing switching parameters such as duty cycle, switch period information and other operating data.

Figure 3:
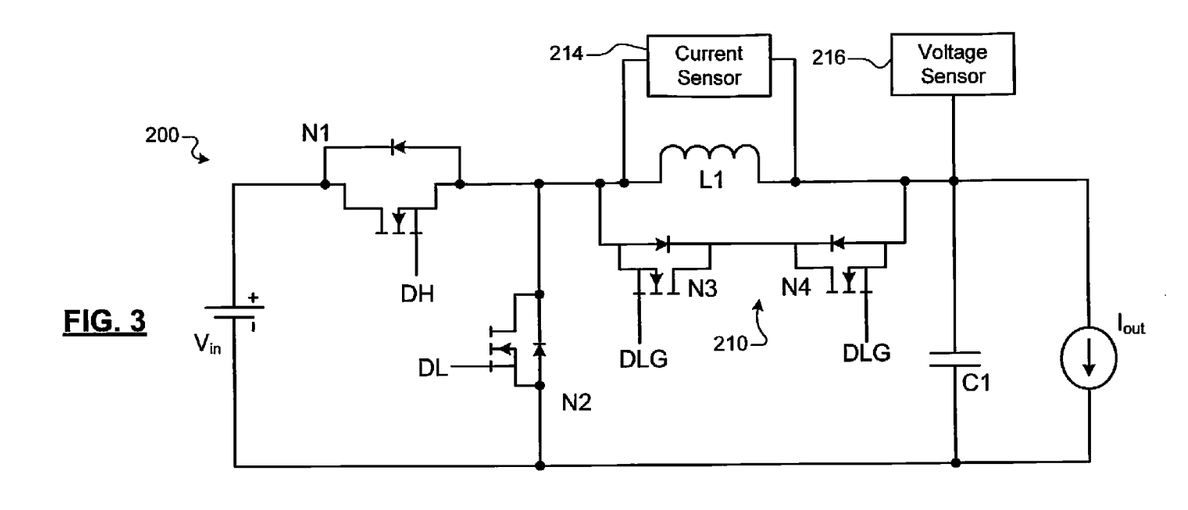
FIG. 3 is an example schematic of a buck converter with a controllable shunt device according to the present disclosure.

Closing the switches N3 and N4 allows the current $I_{L1}$ through the inductance L1 to circulate back to the inductance L1 to minimize power discharging into the capacitance C1 and the load $I_{OUT}$. The switches N3, N4 may be gated ON by the control signal DLG after the switches N1 and N2 are opened and the load $I_{OUT}$ has gone through a sudden decrease and/or $V_{C1}$ has soared above a predetermined target. During normal in-regulation operation, the switches N3 and N4 may be gated OFF.

DLG_HI and DLG_LOW can be adjusted as needed. For example, duration, repetition rate, and control strategy (open-loop fixed timing patterns or closed-loop regulation sensing $V_{C1}$) can be adjusted. In one example approach, the switches N3 and N4 are turned on and the excess energy is dissipated by the resistance of the switches N3 and N4. The amount of time that the switches N3 and N4 are on may be set equal to a predetermined period (for open loop control). Alternately, the amount of time that the switches N3 and N4 are on may be controlled in a closed-loop manner (based on one or more monitored operating parameters of the buck converter).

In another example approach, the switches N3 and N4 may be turned on and off at a predetermined duty cycle for a predetermined period to dissipate the excess energy (for open loop control). Alternately, the switches N3 and N4 may be turned on and off at a duty cycle and period that are determined in a closed loop manner based on an operating parameter of the buck converter.

Current discharging into the capacitance C1 is controlled to provide a controlled soar voltage during a load reduction transition. In effect, the inductance energy is discharged into the capacitance C1 and/or the switches N3 and N4 over a longer period to minimize the voltage soar during the load reduction transition.

In another example, the switches N3 and N4 are turned OFF while the switch N2 is ON and then the switch N2 is turned OFF while the switches N3 and N4 are ON to gradually release stored energy in the output inductance into the output capacitance C1 and the load $I_{OUT}$. Optionally, the switch N2 can be left OFF entirely during repeated N3 and N4 ON-OFF cycles. However, the current $I_{L1}$ will decrease more quickly at the expense of higher dissipation in a body diode of the switch N2.

Conventional body braking techniques circulate inductance current through body diode forward biased junction of the low side switch. Each time body-braking is activated, energy is dissipated in the body diode. The power loss is proportional to the high-level output current just before the output load steps downward and proportional to the repetition rate of these steps.

In battery-powered CPU applications, a power management system may transition frequently between high-load and low-load to take advantage of higher efficiency sleep states without sacrificing performance on-demand. The present disclosure achieves significantly improved efficiency and mitigation of the voltage soar during these transitions by circulating the inductance current when MOSFET switches are used, the current is circulated through the inductance shunting low-RdsON drain-source junction instead of through the low-side switch MOSFET device's body-diode forward-biased PN junction.

Figure 6:
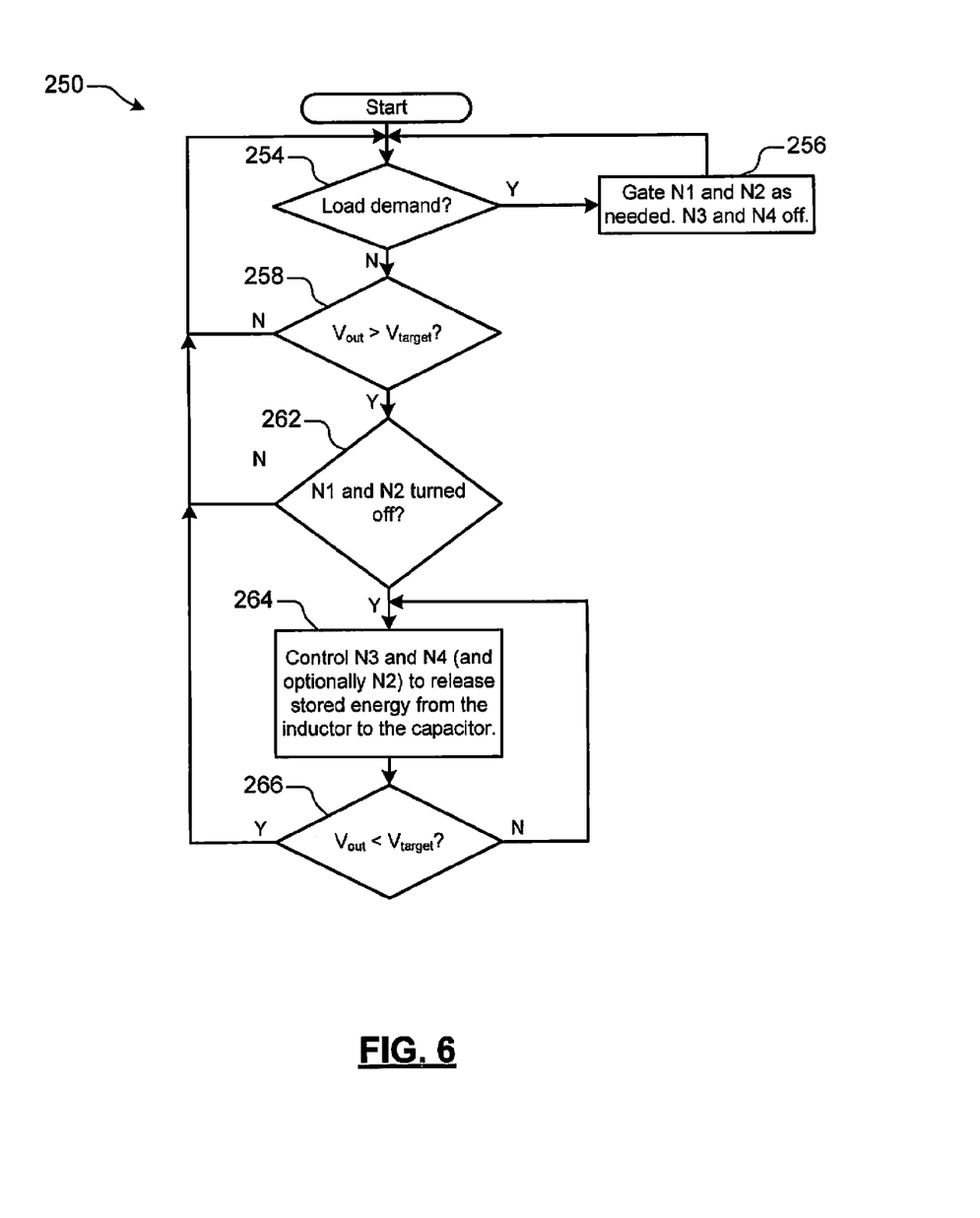
FIG. 6 is an example flowchart illustrating operation of the control module of FIG. 4.

Referring now to FIG. 6, an example flowchart depicting operation of the control module 230 is shown. At 254, control determines whether there is a load demand. If true, control continues at 256 and gates N1 and N2 as needed. Switches N3 and N4 are off. If 254 is false, control determines whether $V_{out}$ is greater than a predetermined target $V_{target}$. If 258 is false, control returns to 254. If 258 is true, control determines whether N1 and N2 are OFF. If 262 is true, control gates the switches N3 and N4 (and optionally N2) as described above to controllably release stored energy from the inductance to the output capacitance. Control continues with 266 where control determines whether $V_{out}$ has decreased below a predetermined target $V_{target}$. This may be determined based on monitored operating parameters (in closed-loop systems) or by waiting a predetermined period (in open-loop systems).

Figure 7:
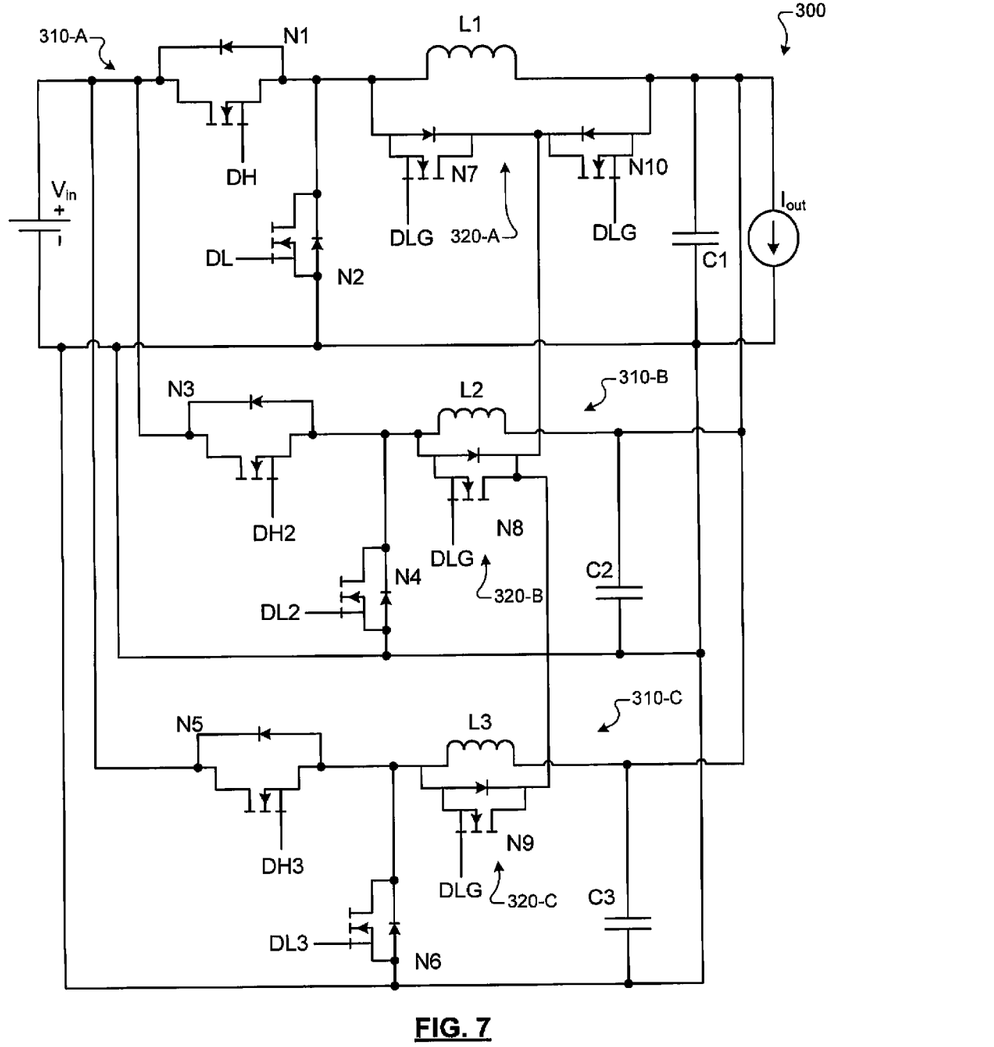
FIG. 7 is an example schematic of a three-phase buck converter according to the present disclosure.

Referring now to FIG. 7, an interleaved multi-phase buck converter 300 is shown that includes a first phase 310-A, a second phase 310-B and a third phase 310-C (collectively phases 310). Each of the phases 310-A, 310-B and 310-C includes a controlled shunt device 320-A, 320-B, and 320-C, respectively. The phases 310 are interleaved as shown.

The first phase 310-A includes switches N1 and N2, the inductance L1, and the capacitance C1. The shunt device 320-A includes switches N7 and N10. The second phase 310-B includes switches N3 and N4, the inductance L2, the capacitance C2. The shunt device 320-B includes switch N8. A front end of the second phase 310-B is connected in parallel across the voltage source $V_{in}$. One end of the switch N8 is connected to one end of the inductance L2 and another end is connected between the switches N7 and N8. The capacitance C2 is connected in parallel across the load $I_{OUT}$.

The third phase 310-C includes switches N5 and N6, the inductance L3, and the capacitance C3. The shunt device 320-C includes switch N9. A front end of the third phase 310-C is connected in parallel across the voltage source $V_{in}$. One end of the switch N9 is connected to one end of the inductance L3 and another end is connected between the switches N7 and N8. The capacitance C3 is connected in parallel across the load $I_{OUT}$.

In use, the switches N1-N6 are controlled to supply a regulated voltage current and/or voltage may be monitored. When the switches are turned off, the switches N7-N10 are gated synchronously to dissipate the energy in the inductances L1-L3 as described above in conjunction with FIGS. 3-6.

A single appropriately sized switch N10 and individual phase NMOS devices are shown to allow circulation and modulation of individual phase inductance currents. N7, N8, and N9 are gated synchronously by the same DLG signal. Alternatively, the switch N10 can be split into multiple phase NMOS devices if keeping the inductance circulation current loop to a small area is warranted in order to reduce magnetic field coupling into adjacent circuitry.

The systems and methods described herein address the inefficacy of buck converters to mitigate undesirable output soar voltage $V_{soar}$ during load decrease transitions or during output inductance current discharge into the output capacitance. The systems and methods allow buck converters to be operated at optimized switching frequency with increased efficiency without sacrificing output transient response or ripple. Alternatively, the size of output capacitances may be reduced. The systems and methods control inductance energy delivery such that even with high values of inductance and low converter switching frequencies, the output will not experience undesirable output soar voltage $V_{soar}$.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A DC-DC converter, comprising:
   a high-side switch;
   a low-side switch connected to the high-side switch;
   an output capacitance;
   an inductance having one end connected to the high-side switch and the low-side switch and another end connected to the output capacitance; and
   a shunting device that circulates current flowing through the inductance back to the inductance during a load reduction transition to control a voltage across the output capacitance.

2. The DC-DC converter of claim 1, wherein:
   the shunting device comprises a first switch connected in parallel across the inductance.

3. The DC-DC converter of claim 1, wherein the shunting device comprises first and second switches that are connected in series; and
   wherein the first and second switches are connected in parallel across the inductance.

4. The DC-DC converter of claim 3, wherein at least one of the first and second switches remains open during load demand.

5. The DC-DC converter of claim 1, further comprising a voltage sensor that senses voltage across the output capacitance.

6. The DC-DC converter of claim 5, further comprising a controller that communicates with the voltage sensor and the shunting device, that opens the shunting device during load demand, and that closes the shunting device in response to the load reduction transition when the voltage across the capacitance is greater than a predetermined voltage.

7. The DC-DC converter of claim 6, wherein the controller turns the shunting device on in an open-loop manner for a predetermined period in response to the load reduction transition.

8. The DC-DC converter of claim 6, wherein the controller turns the shunting device on in a closed-loop manner in response to the load reduction transition for a period based on a monitored operating parameter of the DC-DC converter.

9. The DC-DC converter of claim 6, wherein the controller turns the shunting device on and off in an open-loop manner at a predetermined duty cycle for a predetermined period in response to the load reduction transition.

10. The DC-DC converter of claim 6, wherein the controller turns the shunting device on and off in a closed-loop manner in response to the load reduction transition at a duty cycle and period that are based on a monitored operating parameter of the DC-DC converter.

11. The DC-DC converter of claim 3, further comprising a voltage sensor that senses voltage across the output capacitance.

12. The DC-DC converter of claim 11, further comprising a controller that communicates with the voltage sensor and the first and second switches, that opens at least one of the first and second switches during load demand, and that closes the first and second switches in response to the load reduction transition when the voltage across the capacitance is greater than a predetermined voltage.

13. The DC-DC converter of claim 12, wherein the controller gates the low-side switch on and off in response to the load reduction transition.

14. A DC-DC converter, comprising:
   a first phase comprising:
      a first input;
      a first high-side switch connected to the first input;
      a first low-side switch connected to the first high-side switch;
      a first output capacitance;
      a first inductance having one end connected to the first high-side switch and the first low-side switch and another end connected to the first output capacitance; and
      a first shunting device connected to the first inductance; and
   a second phase having a second input connected across the first input of the first phase and an output connected across the first capacitance, wherein the second phase comprises:
      a second high-side switch connected to the second input;
      a second low-side switch connected to the second high-side switch;
      a second output capacitance;
      a second inductance having one end connected to the second high-side switch and the second low-side switch and another end connected to the second output capacitance; and
      a second shunting device connected to the second inductance.

15. The DC-DC converter of claim 14 further comprising:
   a third phase having a third input connected across the first input of the first phase and a second output connected across the first capacitance, wherein the third phase comprises:
      a third high-side switch connected to the third input;
      a third low-side switch connected to the third high-side switch;
      a third output capacitance;
      a third inductance having one end connected to the third high-side switch and the third low-side switch and another end connected to the third output capacitance; and
      a third shunting device connected to the third inductance,
   wherein the third shunting device comprises a switch having one end connected to the third inductance and another end connected between the first and second switches.

16. The DC-DC converter of claim 14, wherein:
   the first shunting device comprises first and second switches connected in series, wherein the first shunting device is connected in parallel across the first inductance; and
   the second shunting device comprises a third switch having one end connected to the second inductance and another end connected between the first and second switches.

17. The DC-DC converter of claim 16, wherein the third switch and at least one of the first and second switches remains open during load demand.

18. The DC-DC converter of claim 16, further comprising:
   a voltage sensor that senses voltage across the output capacitance; and
   a controller that communicates with the voltage sensor and the first and second shunting devices, that opens the first and second shunting devices in response to load demand, and that closes the first and second shunting devices in response to a load reduction transition when the voltage across the first capacitance is greater than a predetermined voltage.

19. The DC-DC converter of claim 18, wherein the controller controls a duty cycle and period of the first and second shunting devices in an open loop manner in response to the load reduction transition.

20. The DC-DC converter of claim 18, wherein the controller controls a duty cycle and period of the first and second shunting devices in a closed loop manner in response to the load reduction transition.

* * * * *

UNITED STATES PATENT AND TRADEMARK OFFICE
CERTIFICATE OF CORRECTION

Page 1 of 1

PATENT NO. : 8,450,988 B2
APPLICATION NO. : 13/046212
DATED : May 28, 2013
INVENTOR(S) : Steven Fan-Nin Kung It is certified that error appears in the above-identified patent and that said Letters Patent is hereby corrected as shown below:

In the Specifications:

| | |
|---|---|
| Column 3, Line 14 | Delete "code" and insert --codes-- |
| Column 3, Line 18 | Delete "code" and insert --codes-- |
| Column 3, Line 20 | Delete "code" and insert --codes-- |
| Column 3, Line 42 | Delete "$L_{our}$" and insert --$I_{OUT}$-- |

Signed and Sealed this
Twenty-fourth Day of December, 2013

Margaret A. Focarino
*Commissioner for Patents of the United States Patent and Trademark Office*